Dec. 3, 1957 R. E. BROWN 2,814,944
CENTRIFUGAL TESTING APPARATUS FOR INSTRUMENTS
Filed Nov. 4, 1954 7 Sheets-Sheet 1
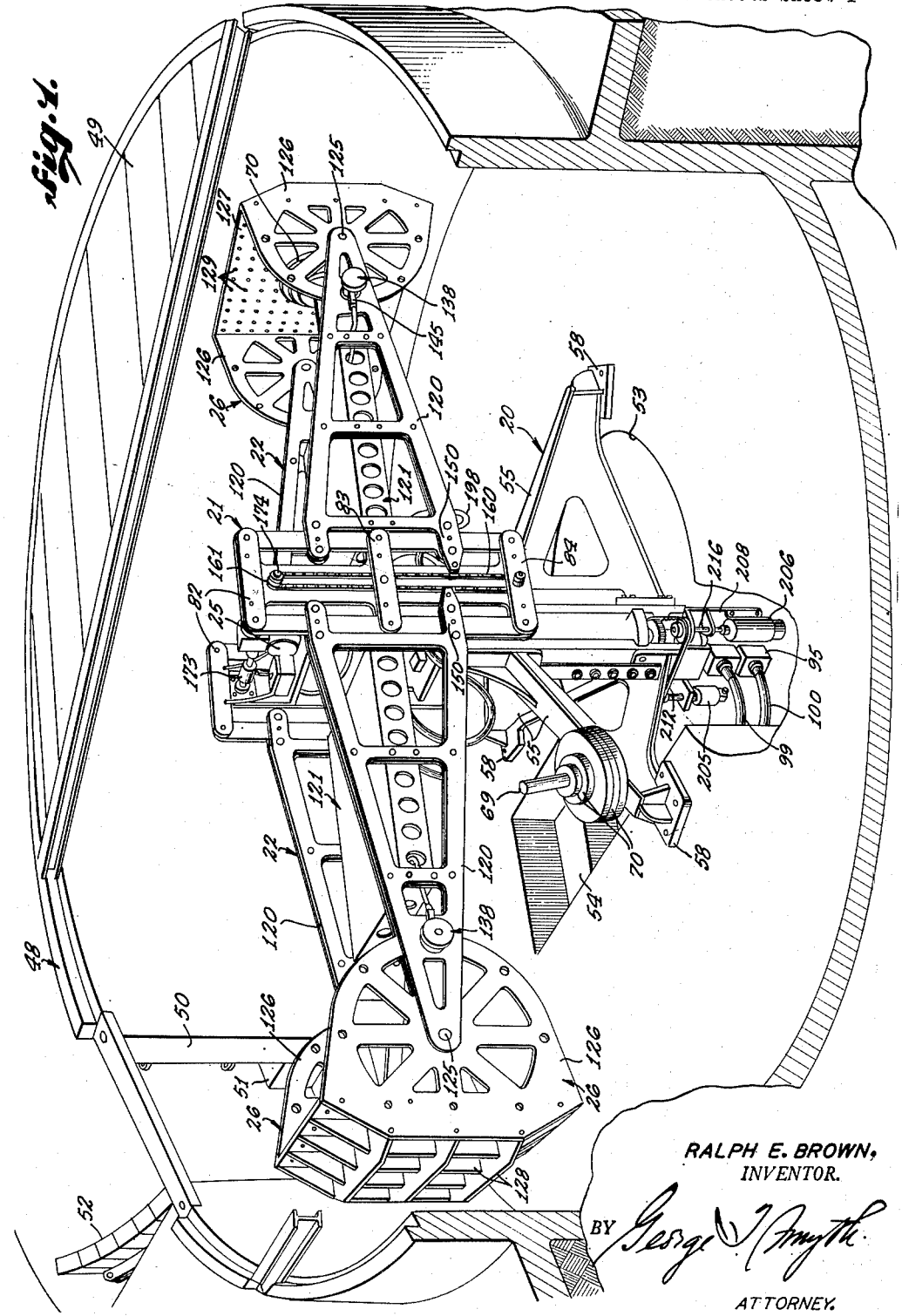
RALPH E. BROWN,
INVENTOR.
BY *George W. Smyth*
ATTORNEY.

Dec. 3, 1957 R. E. BROWN 2,814,944
CENTRIFUGAL TESTING APPARATUS FOR INSTRUMENTS
Filed Nov. 4, 1954 7 Sheets-Sheet 2
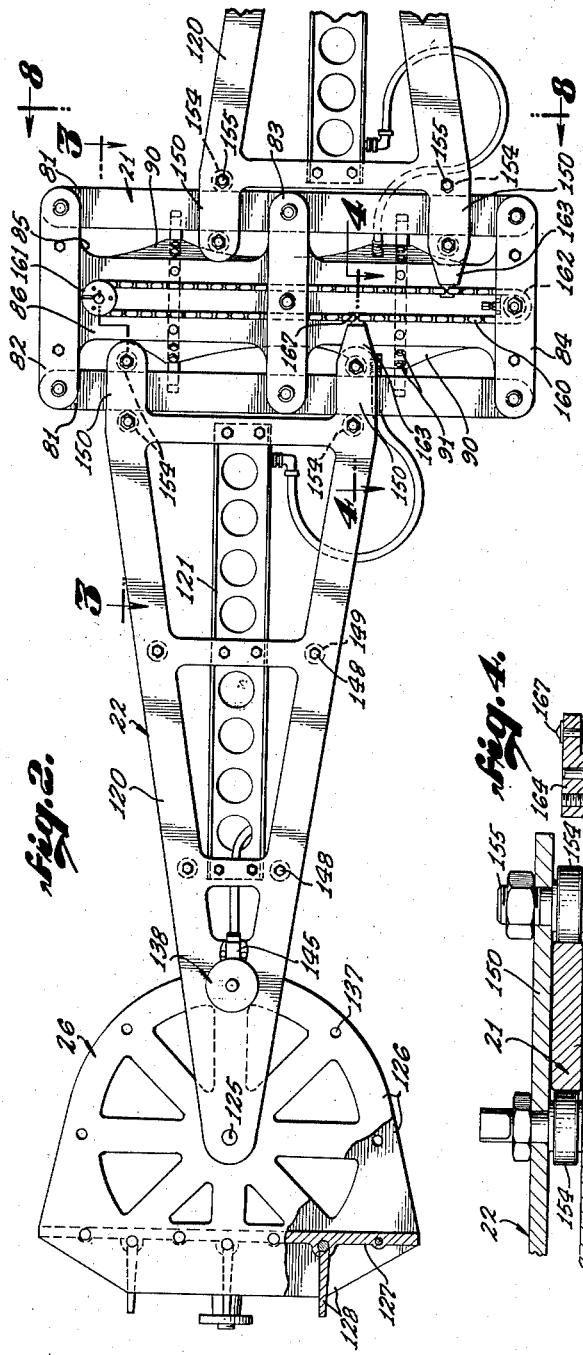
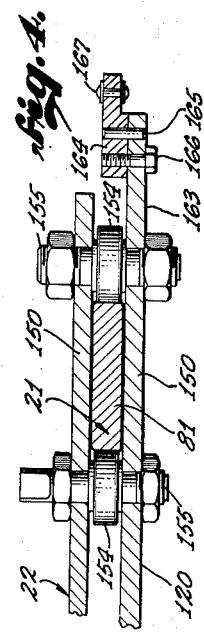
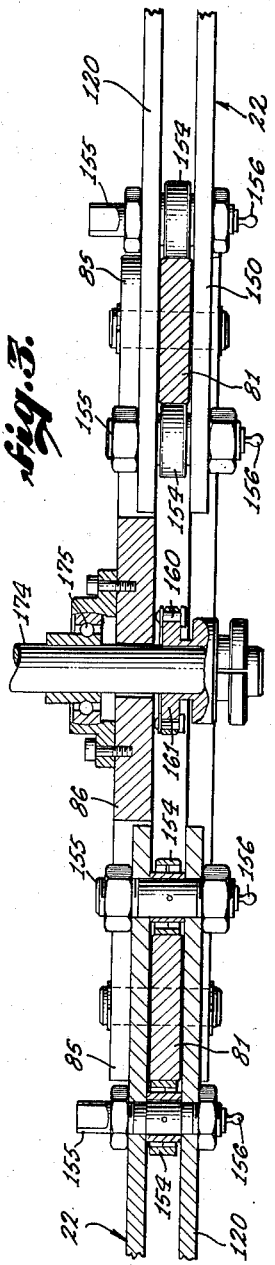
RALPH E. BROWN,
INVENTOR.
BY
ATTORNEY.

Dec. 3, 1957 — R. E. BROWN — 2,814,944
CENTRIFUGAL TESTING APPARATUS FOR INSTRUMENTS
Filed Nov. 4, 1954 — 7 Sheets-Sheet 3
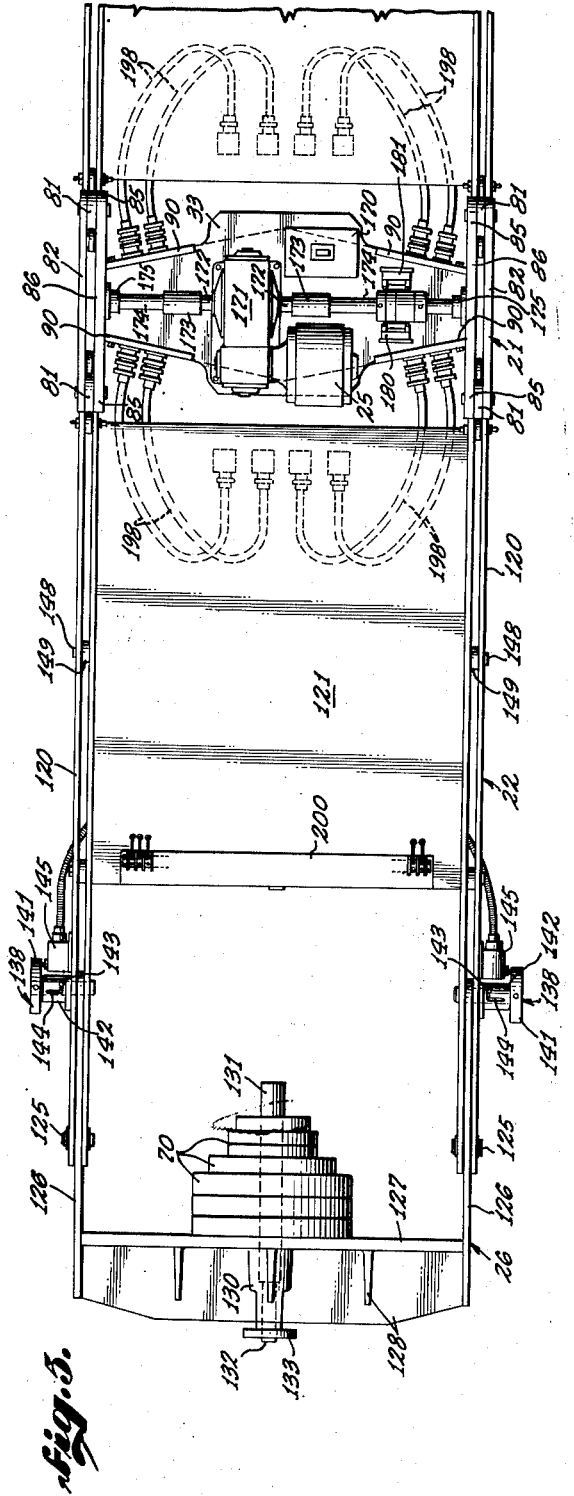
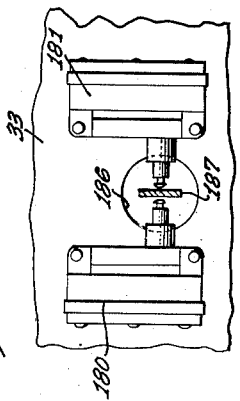
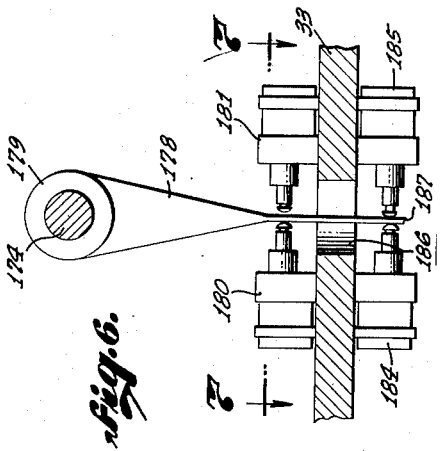
RALPH E. BROWN,
INVENTOR.
BY *George W. Smyth*
ATTORNEY.

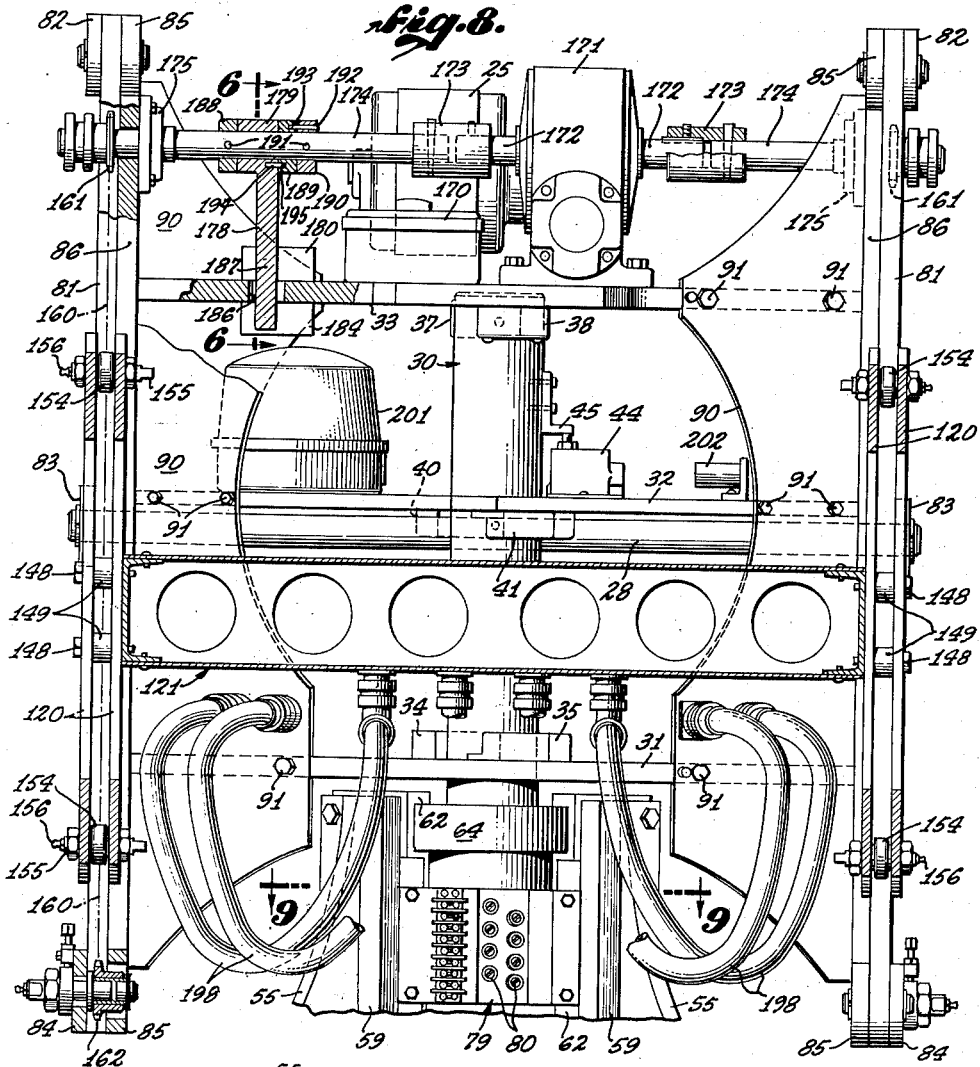
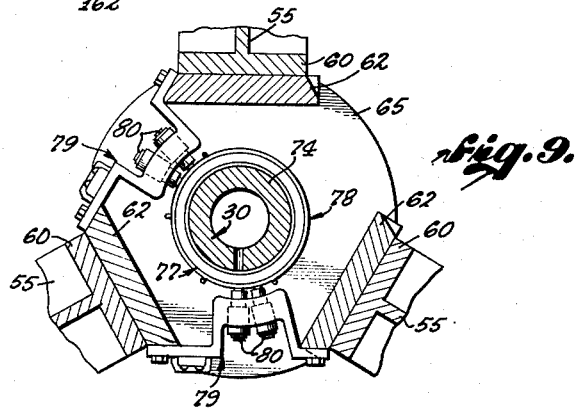

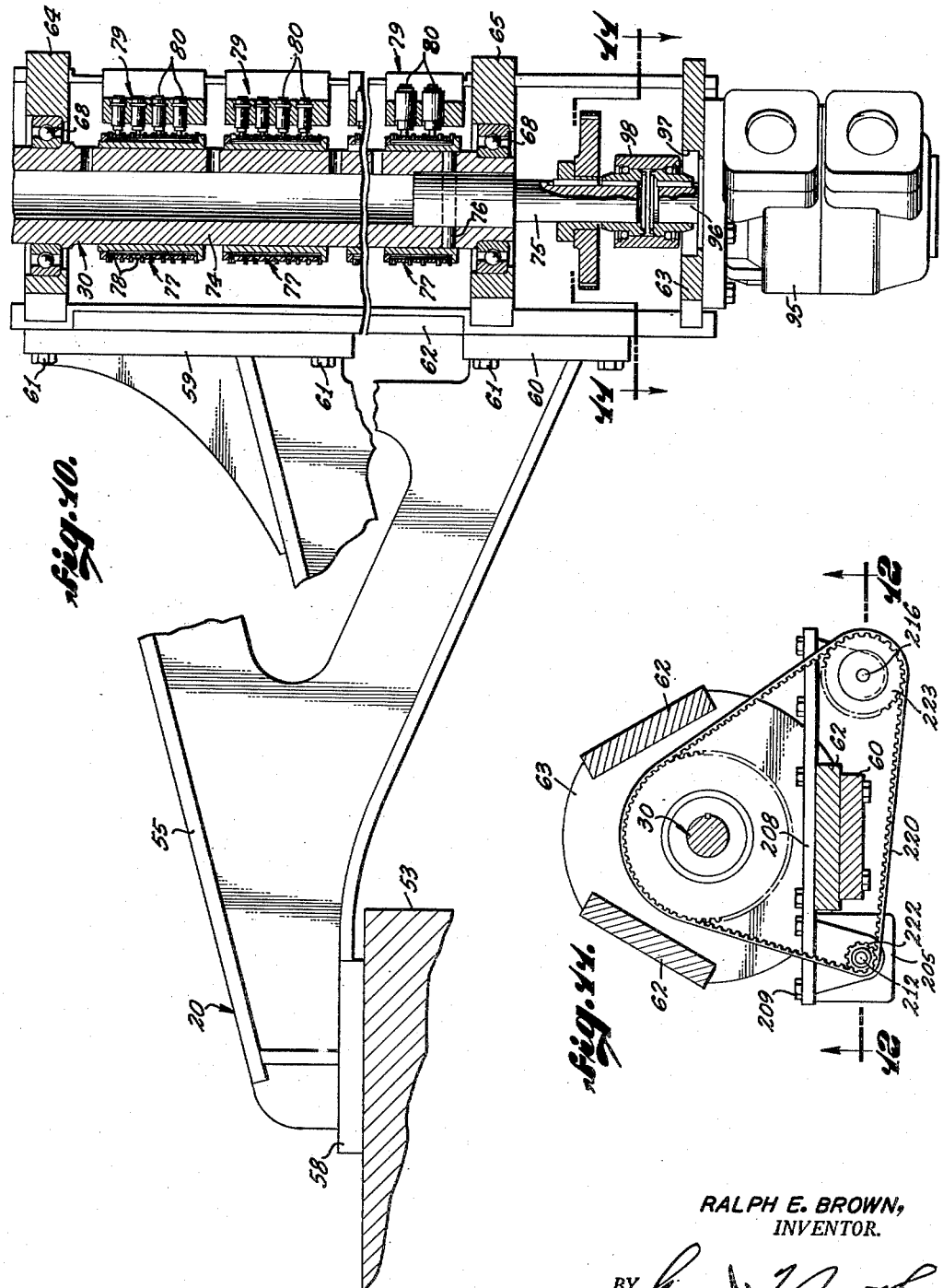

Dec. 3, 1957   R. E. BROWN   2,814,944
CENTRIFUGAL TESTING APPARATUS FOR INSTRUMENTS
Filed Nov. 4, 1954   7 Sheets-Sheet 6
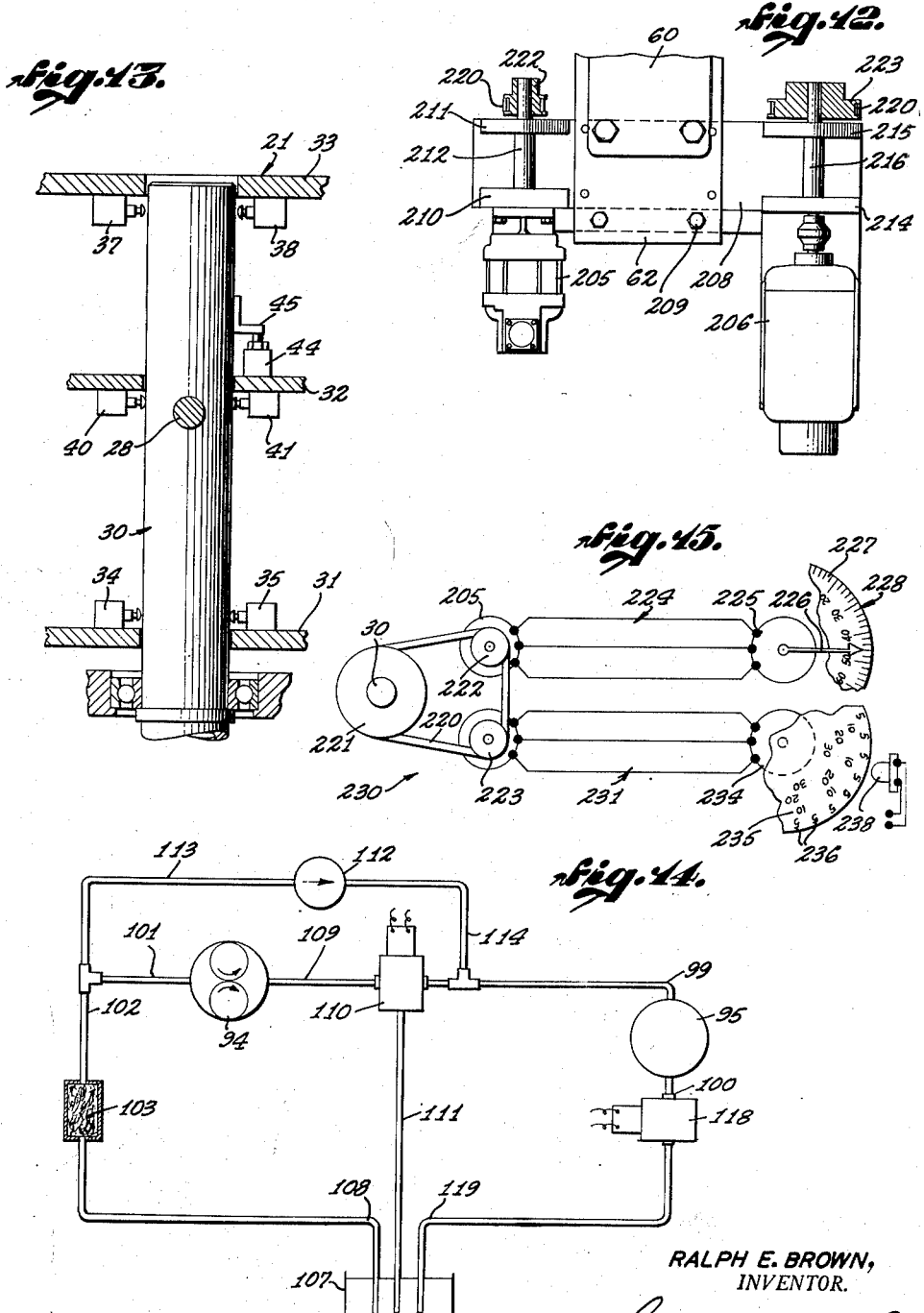
RALPH E. BROWN,
INVENTOR.
BY *George W. Smyth*
ATTORNEY.

RALPH E. BROWN,
INVENTOR.

BY George W. Smyth
ATTORNEY.

United States Patent Office 2,814,944
Patented Dec. 3, 1957

2,814,944
CENTRIFUGAL TESTING APPARATUS FOR INSTRUMENTS

Ralph E. Brown, Los Angeles, Calif., assignor to Genisco, Inc., Los Angeles, Calif., a corporation Application November 4, 1954, Serial No. 466,723

27 Claims. (Cl. 73—1)

This invention relates to test apparatus for subjecting instruments and various other devices to centrifugal force and to simulate constant or steady state acceleration for test purposes.

Broadly described the invention comprises a rotary support structure adapted for rotation about a substantially vertical axis and adapted for both static balance and dynamic balance with reference to the axis of rotation. In the preferred practice of the invention, the rotary support structure includes two platforms on the ends of two diametrically positioned cantilever arms and both platforms may be loaded with devices to be tested or one platform may be loaded with devices to be tested and the other platform loaded with appropriate counterweights. In the initial practice of the invention it is contemplated that each of the two arms will be capable of handling loads up to three hundred pounds maximum and that the apparatus will be capable of subjecting the loads to either constant or slowly varying acceleration loading of maximum magnitude on the order of 60 G.

In general, the invention is directed primarily to the various problems in making such a device safe, foolproof, failproof, and self-adjusting. To make such an apparatus practical and safe for continually repeated test cycles, provisions should be made to avoid operation with excessive weight on the two platforms or with undue static unbalanced between the two arms, or with excessive dynamic unbalance between the two arms. It is to be borne in mind that a residual static unbalance of only five pounds becomes three hundred pounds at full speed centrifugal force of approximately 60 G.

The hazard to personnel is eliminated in various ways. In the first place, the whole apparatus is enclosed by a safety housing, preferably with the housing surrounded by earth at below ground level. In the second place, a safety control system is employed that makes it impossible to energize the apparatus when an operator is inside the housing or when any one of certain essential acts and adjustments have been neglected or overlooked, or when any one of certain hazardous conditions arise.

In the preferred practice of the invention, static unbalance above a predetermined tolerance is detected and indicated by signal means while the apparatus is stationary, to provide guidance in the initial loading of the apparatus. Overweight in the initial loading of the apparatus is also detected and not only results in a warning signal but also results in the apparatus becoming automatically inoperative.

Dynamic unbalance above a predetermined tolerance is detected automatically in the course of operation and an important feature of the invention is the provision of automatic compensation to reduce such unbalance quickly to the predetermined tolerance. If the dynamic unbalance reaches a predetermined maximum magnitude the apparatus is immediately automatically de-energized and if a lesser magnitude of dynamic unbalance arises that cannot be reduced to the predetermined tolerance within the range of the automatic compensating action, the apparatus is also automatically de-energized.

A feature of the preferred practices of the invention is the concept of sensing overloading and unbalance, first, by mounting the two cantilever arms on an upright rotary shaft or the like in a yielding manner that permits limited relative movement between the two arms and the shaft and, second, by detecting any such relative movement that may occur. Thus with the two arms free to move either longitudinally or laterally of the shaft, excessive weight in the initial loading of the two arms may be sensed by detecting consequent downward movement of both arms relative to the upright shaft and excessive dynamic unbalance during operation can be sensed by detecting movement of the two arms in one direction of the shaft. Or, if desired, both static and dynamic unbalance can be sensed by pivotally mounting the two arms on the shaft or the like and detecting rocking movement of the two arms relative to the shaft. The invention teaches that both of these two types of sensing action may be achieved by mounting the two arms on a common pivot axis perpendicular to the axis of rotation of the upright shaft with the pivot axis yieldable for both vertical and horizontal displacement relative to the shaft.

In this regard a feature of the preferred practice of the invention is that the two cantilever arms are pivotally mounted on coaxial flexible members extending radially from the upright rotary shaft so that forces applied to the two cantilever arms will cause rotation of the two arms about their pivot axis and/or flexural displacement of their pivot axis relative to the upright shaft. For example, the desired coaxial flexible members may be provided by mounting a steel crossrod of appropriate dimension on the upright shaft diametrically thereof with the two cantilever arms pivotally supported by the opposite ends of the diametrical rods.

In such an arrangement, rocking movement of the two arms over a limited range relative to the upright shaft may be detected to sense static unbalance above a predetermined tolerance; rocking movement between the two arms and the upright shaft over a range of greater magnitude may be detected to sense dynamic unbalance above a predetermined tolerance while the apparatus is in operation; vertical deflection of the ends of the crossrod may be detected to sense excessive initial dead weight on the two arms above a predetermined safe maximum magnitude; and lateral deflection of the ends of the crossrod may be sensed to detect dynamic unbalance above a predetermined safe maximum magnitude while the apparatus is in operation.

A further feature of the preferred practice of the invention is a provision of means for accurate detection of the rate of rotation of the apparatus at a remote station outside the apparatus housing. For this purpose a remote tachometer indicator is provided to ascertain the approximate range of rate of rotation of the apparatus and a telemetric stroboscopic means is provided to ascertain the precise rate within that range.

The various features and advantages of the invention may be understood from the following detailed description of a selected embodiment of the invention, considered with the accompanying drawings.

In the drawings, which are to be regarded as merely illustrative:

Figure 1 is a perspective view of the selected embodiment of the invention with portions of the enclosing housing removed for the purpose of illustration;

Figure 2 is a side elevation of the central rotary support structure or fulcrum assembly of the apparatus and one of the cantilever arms movably mounted thereon;

Figure 3 is a horizontal section taken as indicated by the broken line 3—3 of Figure 2;

Figure 4 is a fragmentary horizontal section taken as indicated by the line 4—4 of Figure 2;

Figure 5 is a plan view of the structure shown in Figure 2;

Figure 6 is a fragmentary vertical section taken as indicated by the line 6—6 of Figure 8 showing a limit switch arrangement of the balancing motor of the apparatus;

Figure 7 is a sectional view taken as indicated by the line 7—7 of Figure 6;

Figure 8 is a vertical section on an enlarged scale taken as indicated by the line 8—8 of Figure 2;

Figure 9 is a horizontal section taken as indicated by the line 9—9 of Figure 8;

Figure 10 is a view partly in side elevation and partly in section showing how the lower end of the vertical shaft of the apparatus is supported by fixed base structure;

Figure 11 is a transverse section taken as indicated by the broken line 11—11 of Figure 10;

Figure 12 is a view partly in side elevation and partly in section as viewed along line 12—12 of Figure 12;

Figure 13 is a fragmentary diagrammatic sectional view showing an arrangement of switches for detecting relative movement of the central support structure relative to the upright shaft of the apparatus;

Figure 14 is a diagram of the hydraulic transmission system for actuating the upright shaft of the apparatus;

Figure 15 is a diagrammatic view of the system for indicating the speed of rotation of the apparatus; and Figure 16 is a simplified schematic wiring diagram of the electrical system in the selected embodiment of the invention.

General arrangement

Figure 46:
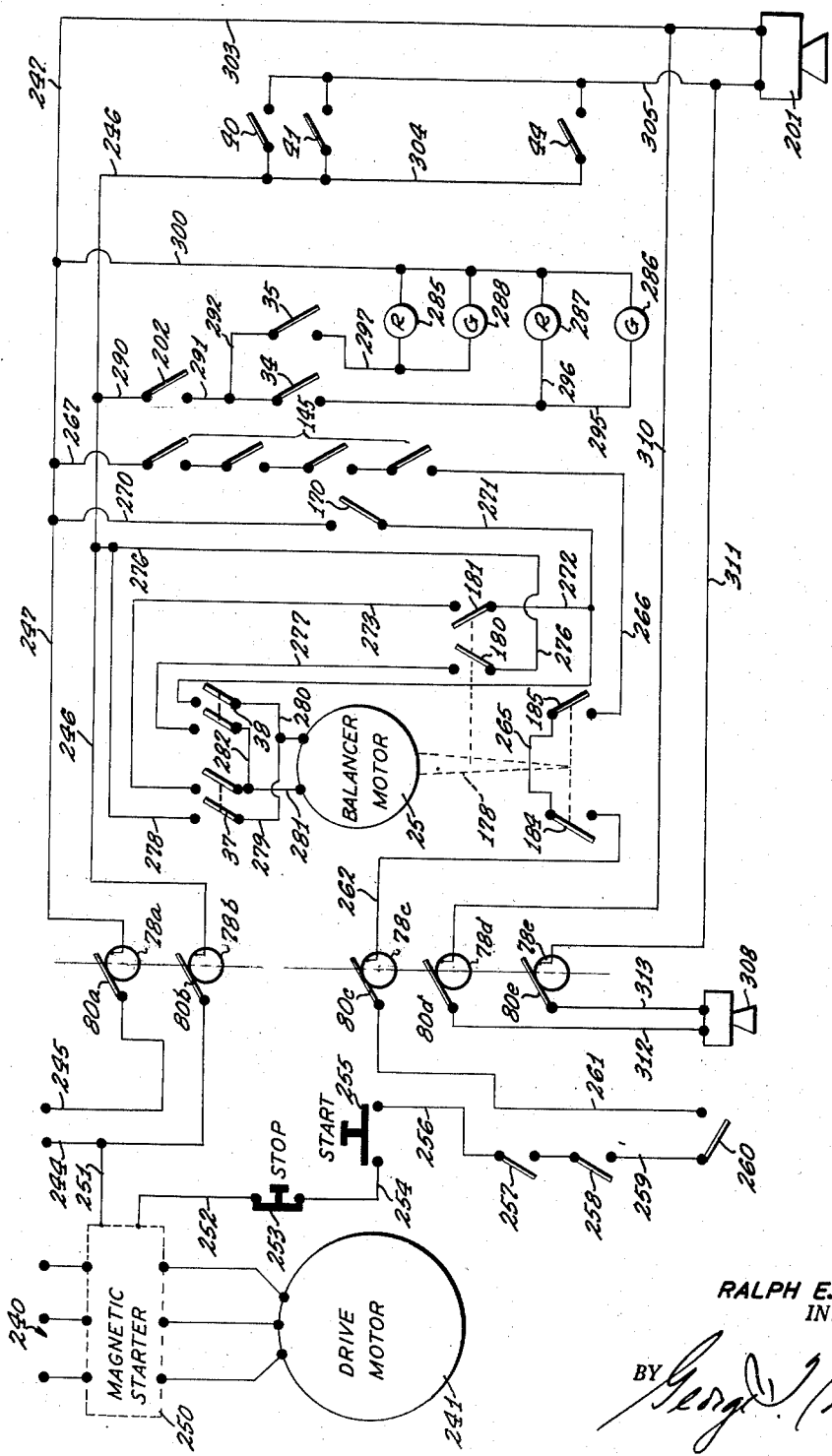

The principal parts of the apparatus shown in Figure 1 include: a fixed base structure, generally designated by numeral 20; a central rotary support structure, generally designated by numeral 21, which may be termed a fulcrum assembly; a diametrical pair of cantilever arms 22 mounted on the fulcrum assembly 21 which arms are vertically movable relative to each other; a balancing motor 25 on the fulcrum assembly to cause relative vertical movement between the two cantilever arms 22 to compensate for dynamic unbalance of the two arms while the apparatus is operating; and a pair of adjustable platform cradles 26 mounted on the outer ends of the two cantilever arms 22, respectively.

As heretofore stated, this embodiment of the invention is characterized by the concept of mounting the fulcrum assembly 21 on a vertical shaft or the like in a yieldingly movable manner for the purpose of sensing certain conditions of unbalance and overloading in the operation of the apparatus. In the present construction, the fulcrum assembly 21 is pivotally mounted on the outer ends of an appropriately flexible steel crossrod 28 which, as best shown in Figures 8 and 13, is mounted diametrically on the vertical power actuated shaft of the apparatus, the shaft being generally indicated by numeral 30.

Any suitable arrangement may be employed to detect various kinds and degrees of relative movement between the fulcrum assembly 21 and the shaft 30 for the various purposes of the invention. In the present arrangement, for example, as shown diagrammatically in Figure 13, the fulcrum assembly 21 includes three horizontal shelves 31, 32, and 33 that are centrally apertured to clear the shaft 30 and on which various microswitches are mounted to respond to relative movement between the fulcrum assembly and the shaft.

In this instance, a pair of microswitches 34 and 35 are positioned on the lower shelf 31 on opposite sides of the shaft 30 to be actuated by rocking movement of relatively low magnitude of the fulcrum assembly relative to the shaft to detect static unbalance above a predetermined tolerance in the initial loading of the two cantilever arms 22. A second pair of microswitches 37 and 38 are mounted on the upper shelf 33 to respond to rocking movement of greater magnitude of the fulcrum assembly relative to the shaft to detect dynamic unbalance between the two cantilever arms above a predetermined tolerance during the rotation of the shaft. A third pair of microswitches 40 and 41 are mounted on the second shelf 32 in the region of the crossrod 28 to respond to excessive lateral displacement of the fulcrum assembly relative to the shaft whenever the static unbalance of the two cantilever arms 22 reaches a predetermined maximum magnitude during the operation of the apparatus. It can be seen that all six of these microswitches are positioned for direct operative contact with the shaft 30. Finally a microswitch 44 is positioned on the middle shelf 32 for actuation by an angular bracket 45 on the shaft 30 to detect excessive downward displacement of the fulcrum assembly relative to the shaft, thereby to sense initial static overloading of the two cantilever arms 22.

In the present practice of the invention, the lower microswitches 34 and 35 control suitable signal means to indicate unbalance for the guidance of the operator in the initial loading of the apparatus, the static unbalance of the two cantilever arms being within an acceptable tolerance when both of the two microswitches are open. The two upper microswitches 37 and 38 govern the operation of the balancing motor 25 when the apparatus is in operation. The overload switches, namely the pair of microswitches 40 and 41 and the microswitch 44 may merely energize a suitable signal means, if desired, but in the present practice of the invention it is contemplated that these overload switches will be effective to prevent energization of the power means for the shaft 30 whenever an overload condition arises.

In addition, as will be explained, means is provided to de-energize the power means for the shaft 30 whenever the balancing motor 25 reaches either of two opposite limit positions. Thus the balancing motor 25 will endeavor to cause relative movement between the two cantilever arms 22 to reduce dynamic unbalance between the arms to an acceptable tolerance during the operation of the apparatus, but whenever the correction required by a dynamic unbalance is beyond the range of relative movement of the two cantilever arms 22, the apparatus will be automatically brought to a stop.

It will be apparent to those skilled in the art that various constructions may be employed to carry out the contemplated general mode of operation of the invention.

The fixed base structure

As shown in Figure 1 the apparatus may be mounted in a safety housing generally designated 48 that is largely below ground level and is covered by a suitable roof 49. Access to the interior of the housing is through a doorway 50 at the bottom of a stairway 51, the doorway being normally closed by a safety door 52. The floor of the housing is formed with a pit 53 having steps 54.

The fixed base structure 20 may comprise a tripod formed by three legs 55 provided with base pads 58, each leg 55 being in the form of a triangular frame having two vertically spaced raised portions 59 and 60. The vertically spaced portions 59 and 60 are connected by bolts 61 to three corresponding vertical support columns 62 which, as shown in Figure 11, are symmetrically spaced around the axis of the upright shaft 30. To complete the fixed base structure, the three columns 62 are interconnected by a lower plate 63 and by two vertically spaced fixed rings 64 and 65 (Figure 10), the upright shaft 30 being rotatably supported by suitable roller bearings 68 in the two rings 64 and 65.

Preferably one of the tripod legs 55 is provided with a post 69 for storage of various ring-shaped weights 70. These weights are used, as required, for balancing the loads on the two cantilever arms 22 in preparation for test runs.

The shaft and the fulcrum assembly

The shaft 30 comprises an upper tubular shaft section 74 that is mounted in the bearings 68, and a solid lower shaft section 75 that is telescoped into the lower end of the tubular shaft section and secured thereto by a crosspin 76. The tubular shaft section 74 carries a plurality of slip-ring assemblies 77 having individual slip-rings 78 which are electrically connected to suitable conductors (not shown) inside the tubular shaft. Corresponding brush assemblies 79 having corresponding individual brushes 80 are mounted on the vertical support columns 62 for cooperation with the slip-ring assemblies as shown in Figure 10.

In the construction of the fulcrum assembly 21, the three previously mentioned shelves 31, 32 and 33 interconnect two upright rectangular frames each of which include a pair of spaced vertical bars 81 of hardened steel to serve as tracks for relative movement of the two cantilever arms 22. In each of these rectangular frames the two tracks 81 are interconnected on one side by three spaced horizontal bars 82, 83 and 84 (Figure 2) and are interconnected on the other side by three corresponding pairs of ears 85 (Figures 2, 5, and 8) that are integral portions of a central upright frame member or plate 86. The fulcrum assembly is completed by two pairs of vertical brace plates 90, each pair diverging from the corresponding vertical frame member 86, as shown in Figures 2 and 5, and each pair being attached to the three shelves 31—33 by suitable screws 91 as best shown in Figure 8.

On each side of the apparatus the previously described flexible crossrod 28 extends through both the vertical frame member 86 and the intermediate horizontal bar 83 at the center of the rectangular side frame. Thus the fulcrum assembly is pivotally mounted on the ends of the yielding crossrod.

Means to drive the shaft

Preferably the upright shaft 30 is actuated by a suitable electric motor through a fluid transmission system that is shown diagrammatically in Figure 14. This system includes a variable displacement hydraulic pump 94, driven by the electric motor, and the variable output of the pump 94 is controlled to, in turn, control the rate of drive of a hydraulic motor 95. The hydraulic motor 95 is mounted on the underside of the lower plate 63 of the fixed structure as shown in Figure 10 and has a drive shaft 96 which extends upward through a central aperture 97 in the plate. This drive shaft is connected to the lower end of the solid shaft section 75 by means of flexible coupling 98.

As shown in Figure 14, the hydraulic motor 95 has an input pipe 99 and a return pipe 100. In Figure 14 the intake side of the hydraulic pump 94 is shown connected by pipes 101 and 102 to a suitable filter 103 which, in turn, is connected to a fluid reservoir 107 by an intake pipe 108. The output side of the hydraulic pump 94 is connected by a pipe 109 with a solenoid relief valve 110, the relief valve being, in turn, connected to the previously mentioned input pipe 99 for the hydraulic motor 95. The solenoid relief valve 110 is connected to a relief pipe 111 that returns to the reservoir 107. Both the hydraulic pump 94 and the solenoid relief valve 110 are by-passed by a suitable check valve 112, one side of the check valve being connected to pipe 101 by a pipe 113 and on the other side being connected to the pipe 99 by a pipe 114. The return pipe 100 from the hydraulic motor 95 is connected to a solenoid restriction valve 118 which, in turn, is connected to the reservoir 107 by a return pipe 119.

In the normal operation of the described hydraulic system with the motor driven hydraulic pump 94 in operation, the solenoid relief valve 110 is de-energized to cut off the relief pipe 111; the check valve 112 is closed; and the solenoid restriction valve 118 is wide open. Oil from the reservoir 107 is fed to the hydraulic pump 94 through pipe 108, filter 103, pipe 102 and pipe 101. The fluid discharged by the hydraulic pump 94 is delivered to the intake side of the hydraulic motor 95 through a pipe 109, solenoid relief valve 110 and input pipe 99. The fluid discharge from the hydraulic motor 95 flows freely through solenoid restriction valve 118 to return to the reservoir 107 through return pipe 119. If the pressure in the input pipe 99 to the hydraulic motor 95 rises unduly, the solenoid relief valve 110 opens in response to the pressure rise to relieve the pressure and in doing so returns a portion of the fluid to the reservoir through the relief pipe 111.

When it is desired to stop or decelerate the apparatus the solenoid relief valve 110 is energized to open for free return flow through the relief pipe 111 to reduce the fluid pressure on the input side of the hydraulic motor, and at the same time the solenoid restriction valve 118 is energized to restrict the return flow from the hydraulic motor to the reservoir 107. The opening of the solenoid relief valve 110 reduces the pressure in the input 99 to cease the delivery of power to the hydraulic motor 95. The hydraulic motor 95 continues to rotate by virtue of the momentum of the rotating apparatus and thus acts as a hydraulic pump that picks up low pressure fluid from the input pipe 99 and forces the fluid through the energized restriction valve 118. The high resistance to fluid flow imposed by energization of the solenoid restriction valve 118 decelerates the hydraulic motor 95. Thus the hydraulic motor in combination with the solenoid restriction valve serves in effect as a hydraulic brake. If the hydraulic pump 94 is stopped during this deceleration period low pressure fluid will be drawn to the input side of the hydraulic motor 95 through the check valve 112.

The two cantilever arms

As may be seen in Figure 1 each of the two cantilever arms 22 comprises a pair of spaced parallel triangular frames 120 interconnected by a box like beam 121. Mounted on the outer end of each cantilever arm 22 by suitable pivots 125 is a previously mentioned platform cradle 26. Each platform cradle comprises two side walls 126 interconnected by a platform 127, the platform being braced by intersecting reinforcements 128 on its underside. As may be seen in Figure 1, each of the two platforms 127 has numerous spaced apartures 129 to facilitate bolting test objects in place and, as best shown in Figure 5, each of the platforms is adapted to carry the previously described ring-shaped counter-weights 70 as may be required for initial balancing of the platform loads. For this purpose the platform is provided with a tubular extension 130 on its underside to serve as a socket for a post 131. The post 131 is formed with a shank 132 of reduced diameter that extends completely through the tubular extension, the shank being threaded at its end to receive a manually rotatable nut 133 for releasably securing the post in place.

Each of the two platform cradles 26 may be adjusted to various angles. For this purpose the two side walls 126 of each cradle are provided with series of apertures 137 for selective releasable engagement by a latch 138, there being a latch on each side of each platform cradle. As shown in Figure 5, each latch 138 comprises a plunger having a head 141 on its outer end for convenience of manipulation. Each latch plunger 138 extends through a collar 142 that is mounted on the corresponding triangular frame 120 and each latch plunger has a radial pin 143 that extends into an L-shaped slot 144 in the collar. In Figure 5 the pins 143 on the two latch plungers 138 are so positioned in the corresponding L-shaped slots 144 as to lock the latch plungers. The two plungers may be unlocked by slight rotation and then may be retracted to free the platform cradle.

For cooperation with a later described control system, a microswitch 145 is positioned adjacent each of the plungers. The microswitches 145 are biased to open and are closed by the corresponding latch plunger heads 141 when the plungers are in latching position.

Each of the triangular frames 120 comprises two members which, as best shown in Figure 5, are slightly spaced apart and are held together by suitable bolts 148 that extend through suitable spacers 149. As shown in Figure 5, the outer end of each of the triangular frames 120 straddles the corresponding side wall 126 of a platform cradle 26 and as shown in Figure 1 each of the triangular frames is formed with a pair of short legs 150 at its inner end, each of the two legs straddling one of the horizontal bars or tracks 81 of the fulcrum assembly 21.

Each of the legs 150 is provided with a pair of heavy duty anti-friction rollers 154 which, as best shown in Figure 3, are mounted on suitable spindles 155 having suitable lubrication fittings 156. Each pair of rollers 154 rides along the opposite edges of the corresponding vertical track 81. Thus four pairs of the rollers 154 on four pairs of legs 150 stabilize each of the two cantilever arms 22 for vertical movement on two of the vertical tracks 81 of the fulcrum assembly 21.

*Automatic compensation for dynamic unbalance*

Any suitable means may be provided to raise and lower the two cantilever arms 22 relative to each other for the purpose of at least partially compensating for dynamic unbalance during operation of the apparatus. In the present construction of the invention a sprocket chain 160 on each side of the fulcrum assembly 21 is looped over an upper drive sprocket 161 and is looped under a lower idler sprocket 162, the sprocket chain lying in a plane between the plane of the three outer horizontal bars 82, 83, and 84 and the plane of the vertical frame member or plate 86.

One of the legs 150 of each of the triangular frames 120 on each side of the apparatus is connected directly to one of the vertical runs of the sprocket chain 160 so that actuation of the upper drive sprocket 161 on each side of the fulcrum assembly simultaneously raises one of the cantilever arms 22 and lowers the other. Figure 4 shows how one leg 150 of each triangular frame 120 may be fabricated with an extension 163 that carries a special fitting 164 for connection with the corresponding sprocket chain 160. The fitting 164 is mounted on the extension 163 by a dowel 165 and a bolt 166. The fitting 164 is provided with suitable rivet or pin means 167 for connection with the sprocket chain 160.

As shown in Figures 5 and 8, the balancing motor 25 for actuating the two sprocket chains 160 is mounted on the upper shelf 33 of the fulcrum assembly 21 and a manual switch 170 for the motor is mounted on the same shelf. The balancing motor 25 is connected to suitable reduction gearing in a gear case 171 and thus actuates a pair of stub shafts 172 that extend from opposite sides of the gear case. The stub shafts 172 are connected by couplings 173 with a pair of corresponding shafts 174 that are journalled in suitable bearings 175. The outer ends of the two shafts 174 carry the previously mentioned upper drive sprocket 161 for the two sprocket chains 160.

The balancing motor 25 is a reversible motor and it is apparent that energization of the motor in either of its two directions will cause one of the cantilever arms 22 to rise and the other to descend. Suitable limit switches are provided to de-energize the balancing motor 25 automatically whenever the two cantilever arms 22 reach limit positions in their relative vertical movement and preferably the limit switch arrangement is such that the main motor for rotating the apparatus is de-energized in addition to the balancing motor. Thus if the balancing motor is not able to compensate for dynamic unbalance within a predetermined acceptable tolerance while the apparatus is in operation, the apparatus will automatically be brought to a stop.

For this purpose a switch actuating arm 178 is mounted on one of the two shafts 174 by means of an integral collar 179, as best shown in Figure 6, for cooperation with an upper pair of limit switches 180 and 181 controlling the circuit of the balancing motor and for further cooperation with a lower pair of limit switches 184 and 185 controlling the main motor that actuates the previously described hydraulic transmission. The first pair of limit switches is mounted on the upper side of the top shelf 33 and the second pair is mounted on the under side of the shelf, the shelf having a circular opening 186 for access to the lower pair of switches. The switch actuating arm 178 terminates in a blade 187 that extends between the switches of each pair. Preferably the arrangement is such that in a limiting action the blade 187 first opens an upper switch to de-energize the balancing motor 25 and then opens the corresponding lower switch as the balancing motor coasts to a stop.

As shown in Figure 8 the collar 179 that carries the switch actuating arm 178 is combined with three other collars 188, 189, and 190 assembled together on the shaft 174. The two end collars 188 and 190 are anchored to the shaft 174 by corresponding crosspins 191. The end collar 190 carries a pin 192 that extends into a concentric groove 193 in the collar 189, which groove is of less than 360 degrees extent. In like manner, the collar 179 carries a pin 194 that extends into a second concentric groove 195 in the collar 189, the extent of this second groove being also less than 360 degrees. By virtue of this arrangement of two pins extending into two concentric grooves, the switch actuating arm 178 has a required range of relative movement on the shaft 174 that is greater than one complete revolution but less than two complete revolutions. When the sprocket chain 160 reaches a limit position, the two pins 192 and 194 reach one end of each of the corresponding concentric grooves 193 and 195 to cause the switch-actuating arm 178 to operate the corresponding limit switches.

The various electrical components on the fulcrum assembly 21 as well as the various electrical components on the two cantilever arms 22 are connected with slip-rings 79 of the slip-ring assemblies 77 on the upright shaft 30. The conductors that extend from the fulcrum assembly 21 to the two cantilever arms 22 are housed in suitable flexible tubes 198, each flexible tube having one end anchored to a brace plate 90 of the fulcrum assembly and having its other end anchored to a beam 121 of a cantilever arm 22. As shown in Figure 5, several of the electrical conductors on each of the cantilever arms are connected to a transverse terminal block 200, which serves as convenient means for connecting instruments under test to electrical circuits outside of the apparatus. The electrical components on the fulcrum assembly 21 include a warning horn 201 that is mounted on the middle shelf 32, as shown in Figure 8, and also includes a mercury switch 202 on the same shelf. The functions of these two components will be explained later.

*Speed indicating system*

As shown in Figures 1, 11 and 12 the speed indicating system includes both a tachometer generator 205 and a telemetric transmitter 206 mounted on the fixed structure of the apparatus and operatively connected to the upright shaft 30. For support of these two devices a vertical plate 208 is mounted by screws 209 on one of the vertical support columns 62 adjacent the lower plate 63 of the fixed structure, as shown in Figures 11 and 12. The vertical plate 208 carries a lower bracket 210 to support the tachometer generator 205 and carries an upper bracket 211 to journal the upright shaft 212 of the generator. In like manner, the vertical plate 208 also carries a lower bracket 214 to support the telemetric transmitter 206 and carries an upper bracket 215 to journal the transmitter shaft 216. For actuating these two devices a suitable toothed belt 220 is formed into an endless loop in engagement with a drive sprocket 221 on the main shaft 30, a sprocket 222 on the generator shaft 212, and a sprocket 223 on the transmitter shaft 216.

As shown diagrammatically in Figure 15 the tachometer generator 205 is connected by a set of wires 224 with a tachometer indicator 225 having a pointer 226 that moves along a speed indicating scale 227 on a dial face 228. It is contemplated that the tachometer indicator 225 will be positioned at an instrument panel at a suitable control station outside the safety housing 48. The telemetric transmitter 206, which is connected to an energizing circuit by a pair of leads 230, is connected by a set of wires 231 with a telemetric receiver 234 adjacent the tachometer indicator dial 228. The telemetric receiver 234 rotates a stroboscopic disc 235 having suitable stroboscopic indicia 236 thereon. The stroboscopic disc is illuminated by a suitable stroboscopic lamp 238 which may be energized by the usual sixty cycle alternating current.

A feature of the preferred practice of the invention is that the stroboscopic disc 235 is of light-transmitting material that is illuminated from below or behind by the stroboscopic lamp 238. Thus the stroboscopic indicia 236 may be photographic images on a transparency to be viewed by light transmitted through the transparency.

The tachometer indicator 225 is accurate within one or two percent and therefore indicates an approximate narrow range in which the true speed of rotation of the apparatus shaft 30 may be found. The indicia 236 on the stroboscopic disc 235 indicates the precise speed of rotation within this narrow range and is accurate within one tenth of one percent.

*Electrical control system*

The preferred practice of the invention includes an electrical control system that is constructed and operated in the manner indicated by the simplified wiring diagram shown in Figure 16.

Three leads 240 from a suitable 3 phase 440 volt source energize the main drive motor 241 that actuates the previously mentioned hydraulic pump 94 of the hydraulic transmission system for rotating the upright shaft 30. Two leads 244 and 245 from a suitable 110 volt source of alternating current energize the balancing motor 25 and the various components of the control system. The two leads 244 and 245 are connected by brushes 80a and 80b and corresponding slip rings 78a and 78b with a corresponding pair of leads 246 and 247 for energizing components on the rotating structure of the apparatus.

The following 110 volt circuit controls the magnetic starter 250 of the main motor 241: wire 251 from lead 244 to the magnetic starter, wire 252, motor stop switch 253, wire 254, motor start switch 255, wire 256, two series-connected key-interlock switches 257 and 258, wire 259, housing door interlock switch 260, wire 261, brush 80c, slip ring 75c, wire 262, previously mentioned limit switch 184, wire 265, previously mentioned limit switch 185, wire 266, four serially connected previously mentioned platform interlock switches 145, wire 267, lead 247, slip ring 78a, brush 80a, and lead 245.

It is contemplated that the test apparatus will be used by two operators working together and that each of the operator will carry on a personal chain a suitable key for closing one of the two key-interlock switches 257 and 258 at a control panel outside of the safety housing 48. Since both of the two operators must be present at the control panel to close both of the switches 257 and 258 for energizing the main motor 250, there is no possibility of the apparatus being started while one of the operators is inside the safety housing.

The switch 260 prevents the apparatus being energized unless the safety door 52 of the housing is closed, this switch being adapted to close in response to closing of the safety door 52. The presence of the four platform interlock switches 145 in the circuit prevents energization of the main drive motor 241 unless all four of the latches 138 are in position to lock the two platform cradles 26. Finally, the presence of the two limit switches 184 and 185 in this circuit causes the main drive motor 241 to be de-energized whenever the balancing motor 25 reaches either of its two limit positions in its attempts to compensate for dynamic unbalance while the apparatus is in operation.

The direction of rotation of the reversible balancing motor 25 depends upon the manner in which it is connected to the two leads 246 and 247 on the rotating structure of the apparatus. The two previously described switches 37 and 38 (Figure 13) are double-pole switches so wired as to connect the balancing motor 25 in opposite respects to the two leads 246 and 247. A wire 270 from the lead 247 on the rotating structure of the apparatus is connected to one side of the previously mentioned manual motor switch 170 on the fulcrum assembly 21. A wire 271 connects the switch 170 with one terminal of the two-pole switch 38 and a branch wire 272 connects wire 271 to one side of previously mentioned limit switch 181, the second side of the limit switch 181 being connected by a wire 273 with one terminal of the other double-pole switch 37. A wire 276 from the second lead 246 on the rotating structure of the apparatus is connected to one side of the previously mentioned limit switch 180, the limit switch, in turn, being connected by a wire 277 with one terminal of the two-pole switch 38. A wire 278 connects wire 276 to one terminal of the two-pole switch 37. One side of the balancing motor 25 is connected by a wire 279 with a third terminal of the two-pole switch 37 and is connected by a wire 280 with a third terminal of the two-pole switch 38. The second side of the balancing motor 25 is connected by a wire 281 with the fourth terminal of the two-pole switch 37 and is connected by a wire 282 with the fourth terminal of the two-pole switch 38. As shown in Figure 6 and as indicated by dotted lines in the wiring diagram, the four limit switches 180, 181, 184, and 185 are operated by the switch-actuating arm 178 in the manner heretofore described.

It is apparent that closing of the two-pole switch 37 will operate the balancing motor 25 in one direction and alternate closing of the two-pole switch 38 will rotate the balancing motor in the opposite direction. The two limit switches 180 and 181 will de-energize the balancing motor 25 at the two limits of the desired range of operation of the two cantilever arms 22 by the sprocket chain 160.

It is contemplated that one of the cantilever arms 22 will be provided with a red lamp 285 and a green lamp 286, and that the other cantilever arm will be provided with a similar red lamp 287 and green lamp 288. Energization of a red lamp on a cantilever arm indicates that the cantilever arm is the heavier loaded of the two arms and energization of the green lamp will indicate that the cantilever arm is the lighter loaded of the two arms. Thus static unbalance greater than a predetermined tolerance in the initial loading of the two platform cradles 26 will cause a red lamp to light on one of the cantilever arms and a green lamp to light on the other cantilever arm. The purpose of the previously mentioned mercury switch 202 is to de-energize these lamps in response to centrifugal force for the sake of increasing the life of the lamp filaments.

A wire 290 connects lead 246 on the apparatus with one side of the mercury switch 202 and wires 291 and 292 connect the mercury switch with the two previously mentioned switches 34 and 35 respectively (Figure 13). The second side of switch 34 is connected by wires 295 and 296 with the two lamps 286 and 287, respectively, and the second switch 35 is connected by wire 297 with the other two lamps 285 and 288. The second terminals of the four lamps are connected by a wire 300 with the second lead 247 on the apparatus. It is apparent that when the switch 34 is closed in response to predominance of static weight on one of the cantilever arms 22 in excess of the predetermined tolerance, the red lamp 287 on that arm will light up and simultaneously the green lamp 286 on the other cantilever arm will light up. Thus an operator at either of the two platform cradles 26 has information as to whether either platform cradle carries an excessive weight differential over the other platform cradle. In this instance a static unbalance of five pounds is considered as an acceptable tolerance limit and one or the other of the two switches 34 and 35 will be closed whenever the five pound differential is exceeded in the loading of either of the two platform cradles.

A wire 303 from lead 247 on the apparatus is connected to one side of the previously mentioned warning horn 201 on the fulcrum assembly. A wire 304 from the other lead 246 on the apparatus is connected to the previously mentioned switches 40, 41 and 44 (Figure 14) and these three switches are connected in turn to the second side of the horn 201 by a wire 305. Preferably a second warning horn 308 positioned outside the safety housing 48 to be heard from the control station is connected in parallel with the horn 201. For this purpose a wire 310 extends from wire 303 to a slip-ring 78d and a wire 311 connects wire 305 with a slip-ring 78e. Corresponding brushes 80d and 80e are connected to the outside warning horn 308 by wires 312 and 313 respectively.

Operation of the apparatus

The operation of the apparatus may be readily understood from the foregoing description. In the initial loading of the apparatus for a test operation, objects and devices to be tested may be placed on either or both of the two platform cradles 26. In either event counterweights 70 are mounted on a post 131 at one or both the platform cradles as may be required to bring the initial static weight differential between the two cantilever arms within the accepted tolerance of five pounds. Guidance in this procedure of statically balancing the two cantilever arms 22 is provided by the signal lamps 285—288. When the lamps fail to light up the static unbalance is within the desired five pound tolerance.

While the two upper switches 37 and 38 function to correct dynamic unbalance during a test operation, whenever the dynamic unbalance reaches a magnitude of 50 pounds, these two switches also cooperate with the limit switches 184 and 185 to prevent initiation of a test operation if the initial loading of the apparatus results in a static unbalance of a magnitude of 50 pounds. Thus, an excessive static unbalance of 50 pounds or more in the initial loading of the apparatus operates one of the two switches 37 and 38 to energize the balancing motor 25 until the corresponding limit switch 180 or 181 is opened and the corresponding limit switch 184 or 185 is also opened. The limit switch 180 and 181 deenergizes the balancing motor 25 and the limit switch 184 or 185 in the circuit of the main drive motor makes it impossible to start a test operation.

If the two cantilever arms 22 are statically balanced within the required tolerance but, nevertheless, carry a combined weight that is too great for safety the switch 44 will close automatically to energize the two warning horns 201 and 308.

When the apparatus is properly loaded in static balance, the start button 255 may be depressed to start the main drive motor 241 but, as heretofore pointed out, the main drive motor cannot be started if any of the platform interlock switches 145 are open, or if either of the two limit switches 184 and 185 is open, or if the switch 260 controlled by the housing door 52 is open, or if either of the key-interlock switches 257 and 258 is open with the corresponding operator away from the control station.

When the apparatus is in operation, dynamic unbalance will occur if the centers of gravity of the loaded cantilever arms 22 are not level with each other. Thus any dynamic unbalance between the two cantilever arms 22 while the apparatus is in operation creates a couple that tends to rotate the fulcrum assembly 21 about its yielding pivot axis on the two ends of the crossrod 28. If the dynamic unbalance or couple is less than the acceptable tolerance of 50 pounds, the apparatus will operate without any action by the control system. If, however, the dynamic unbalance reaches a magnitude of 50 pounds one of the two switches 37 and 38 will close in accord with the direction of the dynamic unbalance and the motor 25 will be energized thereby to shift the two cantilever arms 22 vertically relative to each other in a direction to compensate for the dynamic unbalance. If sufficient compensation is attainable in this manner the corresponding balancing switch 37 or 38 will open to de-energize the balancing motor. If, however, the excessive dynamic unbalance cannot be reduced to the acceptable limit within the range of operation of the balancing motor, the switch-actuating arm 178 will cause a corresponding limit switch 180 or 181 and a corresponding limit switch 184 or 185 to open automatically and the apparatus will be brought to a stop. If the dynamic overload reaches a magnitude as high as three hundred pounds one of the two overload switches 40 or 41 will be closed to energize the two warning horns 201 and 308.

Although the now preferred embodiment of the present invention has been shown and described herein, it is to be understood that the invention is not to be limited thereto, for it is susceptible to changes in form and detail within the scope of the appended claims.

I claim:

1. In an apparatus of the character described for centrifugal testing operations, the combination of: a power driven upright rotary means; support structure including a pair of diametrically opposite radial arms mounted on said means, at least one of said arms being adapted to carry test objects, at least one of said arms being movable up and down relative to the other; means to sense dynamic unbalance between the two arms while the support structure is rotating; and means responsive to said sensing means to cause relative movement between the two arms in a direction to compensate for the dynamic unbalance.

2. A combination as set forth in claim 1 in which said responsive means includes a reversible motor on the support structure operatively connected to at least one of said two arms.

3. A combination as set forth in claim 1 which includes means to detect static unbalance between the two arms when said support structure is stationary.

4. A combination as set forth in claim 3 which includes signal means responsive to said detecting means.

5. A combination as set forth in claim 4 in which said signal means comprises lamp means; and in which means responsive to rotation of said support structure de-energizes said lamp means.

6. A combination as set forth in claim 1 which includes means to detect and signal static overloading of the two arms.

7. A combination as set forth in claim 1 which includes a prime mover to actuate said upright rotary means; and which includes means to prevent energization of said prime mover in response to static overloading of said two arms.

8. A combination as set forth in claim 1 in which at least one of said two arms is provided with a platform for test objects in combination with latch means to secure the platform at selected degrees of inclination; and which includes means responsive to said latch means to prevent actuation of said upright rotary means when said platform is unlatched.

9. In an apparatus of the character described for centrifugal testing operations, the combination of: a power-driven upright rotary means; support structure including upright tracks mounted on said rotary means and a pair of diametrically opposite radial arms mounted on said tracks for movement thereon of the two arms respectively, at least one of said arms being adapted to carry test objects; means to sense dynamic unbalance between the two arms while the support structure is rotating; and means responsive to said sensing means to move said two arms simultaneously in opposite directions on said track to compensate for the dynamic unbalance.

10. A combination as set forth in claim 9 in which said two arms are operatively connected to opposite sides of a loop of flexible driving means.

11. A combination as set forth in claim 1 which includes means responsive to relative movement between said two arms to de-energize said upright rotary means when the two arms reach the limit of their relative movement in a direction to compensate for dynamic unbalance between the two arms.

12. In an apparatus of the character described for centrifugal testing operations, the combination of: a power-driven upright rotary means; a central support structure yieldingly mounted on said means for rotation therewith and for limited movement relative thereto; a pair of diametrically opposite radial arms mounted on said support structure, at least one of said arms being adapted to carry test objects, at least one of said arms being movable up and down relative to the other arm; and means responsive to relative movement between said rotary means and said support structure to cause relative movement between said two arms to compensate for dynamic unbalance between the two arms.

13. A combination as set forth in claim 12 which includes means responsive to relative movement between said rotary means and said central structure to indicate static unbalance between the two arms.

14. A combination as set forth in claim 12 which includes means responsive to relative movement between said support structure and said rotary means to stop the rotary means when the dynamic unbalance between the two arms reaches a predetermined maximum magnitude.

15. A combination as set forth in claim 12 which includes means responsive to relative movement between said central structure and said rotary means to prevent actuation of said rotary means when said two arms carry a static load exceeding a predetermined maximum magnitude.

16. In an apparatus of the character described for centrifugal testing operations, the combination of: a power-driven upright rotary means; a central support structure pivotally mounted on said means for rotation therewith and for limited rocking movement relative thereto; a pair of diametrically opposite radial arms mounted on said central structure, at least one of said arms being adapted to carry test objects, at least one of said arms being movable up and down relative to the other arm; and means responsive to rocking movement of said central structure to cause relative movement between the two arms in a direction to compensate for dynamic unbalance between the two arms while said support structure is rotating.

17. A combination as set forth in claim 16 which includes means responsive to rocking movement of said central structure to indicate static unbalance between the two arms when said rotary means is stationary.

18. In an apparatus of the character described for centrifugal testing operations, the combination of: a power-driven upright rotary means; a central support structure on said rotary means; pivot means to support said central structure for limited rocking movement relative to said rotary means, said pivot means being yieldingly mounted on said rotary means for limited displacement relative thereto; a pair of diametrically opposite radial arms mounted on said support structure, at least one of said arms being adapted to carry test objects, at least one of said arms being movable up and down relative to the other arm; and means responsive to relative movement between said support structure and said rotary means to cause relative movement between said two arms in a direction to compensate for dynamic unbalance between the two arms.

19. A combination as set forth in claim 18 which includes means responsive to rocking movement of said central structure relative to said rotary means to indicate static unbalance between said two arms when said rotary means is stationary.

20. A combination as set forth in claim 18 which includes means responsive to vertical displacement of said pivot means relative to said rotary means to detect static overloading of said two arms.

21. A combination as set forth in claim 20 which includes means responsive to said detecting means to prevent actuation of said rotary means when said two arms are statically overloaded.

22. A combination as set forth in claim 18 in which said responsive means responds to rocking movement of said central structure while the central structure is being rotated by said rotary means.

23. A combination as set forth in claim 18 which includes means responsive to rocking movement of relatively small magnitude between said support structure and said rotary means to indicate static unbalance between the two arms when said rotary means is stationary; and which includes means responsive to rocking movement of greater magnitude between said support structure and said rotary means for causing relative movement between said two arms in a direction to compensate for dynamic unbalance between the two arms while said rotary means is operating.

24. A combination as set forth in claim 18 which includes means responsive to horizontal displacement of said pivot means relative to said rotary means to detect excessive dynamic unbalance between said two arms.

25. A combination as set forth in claim 24 which includes means responsive to said detecting means to de-energize said power-driven means.

26. A combination as set forth in claim 18 in which said pivot means comprises a pair of diametrically positioned radial flexible members substantially perpendicular to said two arms, said support structure being mounted on said flexible members at points spaced radially from said rotary means whereby the flexible members yield in response to forces transmitted thereto by said support structure.

27. A combination as set forth in claim 26 in which said two flexible members are formed by a single cross-rod mounted on said rotary means diametrically thereof.

References Cited in the file of this patent
UNITED STATES PATENTS

| 2,070,623 | Satterlee | Feb. 16, 1937 |
| 2,088,613 | Satterlee | Aug. 3, 1937 |
| 2,179,247 | Arnold | Nov. 7, 1939 |
| 2,238,989 | Bradbury | Apr. 22, 1941 |
| 2,420,592 | Gerhardt | May 13, 1947 |
| 2,465,437 | Engelhardt | Mar. 29, 1949 |
| 2,534,267 | Kahn | Dec. 19, 1950 |

OTHER REFERENCES

Publication "Genisco G Accelerator," 7 pages, received January 1952. Copy in 73–1.